Figure 1:
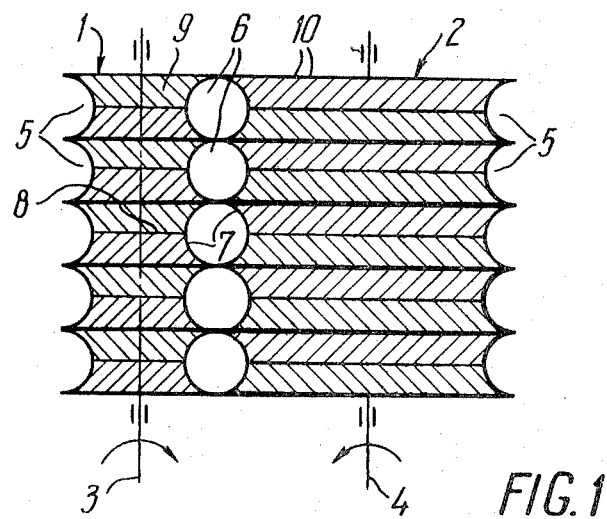

United States Patent [19]

Bochanov et al.

[11] 3,843,299
[45] Oct. 22, 1974

[54] DEVICE FOR SHAPING SPHERICAL PELLETS

[76] Inventors: Viktor Nikolaevich Bochanov, ulitsa Zhelyabova, 13, kv. 48; Veniamin Alexandrovich Minchenko, Mikroraion 13, dom 15, kv. 75; Svyatoslav Sergeevich Schipitsin, ulitsa Karla Marxa, 44a, kv. 19, all of Angarsk Irkutskoi Oblasti, U.S.S.R.

[22] Filed: Sept. 1, 1972

[21] Appl. No.: 285,858

[52] U.S. Cl. ............... 425/332, 425/333, 425/363, 74/230.1, 29/125
[51] Int. Cl. ..................... B29c 15/00, B29b 1/02
[58] Field of Search ........... 425/332, 333, 374, 363; 29/124, 121 R, 132, 130, 125; 74/232, 233, 231.1, 230.15, 230.13

[56] References Cited
UNITED STATES PATENTS

| 767,268 | 8/1904 | Felsing, Jr. | 425/363 X |
| 815,811 | 3/1906 | Goodman | 425/363 |
| 2,142,112 | 1/1939 | Criley | 29/132 X |
| 2,327,245 | 8/1943 | Bridge | 425/332 |
| 2,586,089 | 2/1952 | Rhodes | 425/363 |
| 2,600,291 | 6/1952 | Engler | 29/130 X |
| 2,739,546 | 3/1956 | Bonnafoux | 425/363 X |
| 3,277,527 | 10/1966 | Essers et al. | 425/363 X |

Primary Examiner—Robert L. Spicer, Jr.
Attorney, Agent, or Firm—Waters, Roditi, Schwartz & Nissen

[57] ABSTRACT

A device for shaping spherical pellets comprises at least one pair of rotatable rollers or drums having parallel axes of rotation, disposed adjacent to each other by their lateral cylindrical surfaces. Provision is made on the lateral drum surfaces for circular flutes or cannelures arranged in pairs opposite each other so as to form a row of shaping grooves that are circular in cross section. Some of the circular portions of each pair of cannelures, arranged asymmetrically with respect to their common middle diametral plane, transversal to the drums, feature a higher coefficient of friction as compared to the rest of the cannelure surfaces.

6 Claims, 2 Drawing Figures

PATENTED OCT 22 1974                                   3,843,299

DEVICE FOR SHAPING SPHERICAL PELLETS

This invention relates to equipment for processing plastic materials and is concerned with devices for shaping spherical pellets, mostly employed as a catalyst.

One prior-art device for shaping spherical pellets is known to use heretofore comprising at least two rotary drums having parallel axes of rotation and adjacent to each other with the lateral cylindrical surfaces thereof, wherein provision is made for open circular flutes semicylindrical in cross section and arranged on the drums in pairs opposite to each to form a number of circular shaping grooves.

The bunch of a plastic material produced by, say, an extrusion machine is placed in between the rotary drums parallel to the axes of rotation thereof to be bitten by the drums and, while passing through the circular shaping grooves, is shaped into spherical pellets.

However, in the afore-said device for shaping spherical pellets the latter assume a somewhat oblate (toroidal) shape, whereas flashes are left on the strips of pellets corresponding to the lines of contact with the rotary drums, said flashes concentrating stresses and thus impairing the mechanical strength of the pellets. When such pellets are used as, say, a catalyst in catalytic processes in a fluidized bed, the flashes on the pellets are broken off, the intactness of the pellet surfaces in disturbed and further destruction of the pellets occurs. Moreover, in the process of rolling-up the pellets in the known device, the axis of rotation of the pellets moves plane-parallel with respect to the line of contact of the drums, and as a result of the fact that on the pellet surface portions adjacent to the axis of rotation of the pellets, linear velocities are higher and the length of circumferences, along which the rolling-up occurs, is smaller than on the pellet surface portions far from the axis of rotation, torsion moments are liable to arise between said portions of the pellet surfaces, resulting in the formation of pellets having a laminated structure.

In turn, the laminated structure of a pellet to a great extent adversely affects the mechanical strength thereof.

It is therefore an essential object of the present invention to provide such for shaping spherical pellets that is capable of producing true-shape pellets free from laminated structures or flashes.

This object is accomplished in that in a device for shaping spherical pellets, comprising at least one pair of rotatable rollers or drums having parallel axes of rotation and adjacent to each other by their lateral cylindrical surfaces, wherein provision is made for open circular flutes or cannelures, semicylindrical in cross section, located on the drums in opposite pairs to form a row of shaping grooves of circular cross-section, according to the invention some of the circular sections of the surfaces of the cannelures of flutes made on the rollers to form a shaping groove, said sections being arranged asymmetrically with respect to their common middle diametral plane, transverse with respect to the roller or drums, feature a higher coefficient of friction as compared to the remaining surfaces of the cannelures.

The contour of each of the cannelures can be established by separate member, e.g. in the form of rings or disks, made of materials possessing different values of the coefficient of friction.

Each cannelure can be formed by two rings or disks whose butts are located at the centers of the cannelure depressions, the rings or disks belonging to the different drums and located opposite one another are made of materials possessing different values of the coefficient of friction.

A disk or ring can be provided with two half cannelures or annular recesses arranged symmetrically with respect to the average diametral plane thereof, each of said recesses making up half the profile of the two adjacent roller cannelures.

The proposed device for shaping spherical pellets makes it possible to considerably improve the quality of the pellets obtained, increase their strength and reduce attritability due to elimination of the laminated pellet structure and the absence of flashes thereon which are the cause of destruction of the pellets, e.g., when used in apparatus with a fluidized bed.

Figure 2:
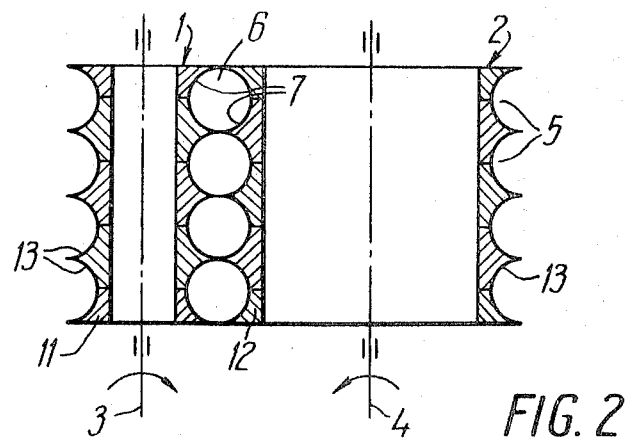

In what follows the present invention is disclosed in detail by consideration of exemplary embodiments thereof with reference to the accompanying drawings, wherein:

FIG. 1 is a somewhat schematic longitudinal sectional view of a device for shaping spherical pellets, whose rollers or drums are composed of disks, according to the invention; and FIG. 2 is a similar view of another device for shaping spherical pellets, whose rollers or drums are composed of rings, according to the invention.

Reference being now directed to FIG. 1, the device for shaping spherical pellets comprises at least one pair of rotary rollers or drums 1, 2 having parallel axis of rotation 3, 4 and disposed adjacent each other by their lateral cylindrical surfaces, wherein are made open circular flutes or cannelures 5, that are semicylindrical in cross section. The cannelures 5 located on the rollers 1 and 2 are arranged in opposite pairs to form a row of circular shaping grooves 6.

Some half cannelures or annular portions 7 of the surfaces of the cannelures 5 in the rollers 1 and 2, that form the shaping grooves 6, arranged asymmetrically with respect to their common middle diametral plane 8 which is transverse with respect to the rollers 1 and 2, feature a higher coefficient of friction than the rest of the surfaces of the cannelures 5.

To provide different values of the coefficient of friction, effective on some portions of the surfaces of the cannelures 5, it is expedient to make the rollers 1 and 2 of separate members, e.g. in the form of disks 9 and 10 or rings 11 and 12 (FIG. 2), featuring different values of the coefficient of friction.

Each cannelure 5 of the rollers or drums 1 and 2 can be formed by the two rings or two disks 9 or 10 (FIG. 1) whose butts are located at the centers of the depressions in the cannelures 5, the opposite disks 9 and 10, belonging to the drums 1 and 2 respectively, are made of materials possessing different values of the coefficient of friction.

For convenience in manufacture the drums 1 and 2 may be composed of disks or rings of which each has two half cannelures or annular recesses arranged symmetrically with respect to the middle diametral plane thereof as, say, annular recesses 13 in the rings 11 and 12. Each annular recess 13 forms half the profile of a cannelure 5.

The device for shaping spherical pellets operates as follows. A bunch of a plastic material is fed between the rotary rollers or drums 1 and 2 rotating towards each other (the sense of rotation being indicated by arrows) parallel to the axes of rotation 3 and 4 of said cylinders. The diameter of the bunch should correspond to the diameter of the pellets being shaped, while its length should be equal to the length of the rotary drums 1 and 2 (the bunch not being shown in the drawing).

Then the bunch of plastic material is bitten by the rotating drums 1 and 2 and processed thereby into measured pellets.

The thus-obtained pellets, while passing through the shaping grooves 6, rotate about their own axes which are out of coincidence with the line of contact of the surfaces of the drums 1 and 2.

The rotation of a pellet results from the fact that its diametrally opposite points, lying in the planes square with the axes of rotation 3 and 4 of the rotary drums 1 and 2, and adjacent to the surfaces of the cannelures 5 of the two different rotary drums 1 and 2, move at different linear velocities.

Alongside therewith, as a result of the fact that some portions 7 of the surfaces of the cannelures 5 of the rollers 1 and 2 that form the shaping groove, arranged asymmetrically with respect to their common diametral plane 8, transversal with respect to the drums 1 and 2, feature a higher coefficient of friction as compared to the rest of the surface of the cannelures 5, the axis of rolling-up of the pellets being shaped (i.e., the instantaneous position of the axis of rotation of a pellet in the course of the rolling-up process in any given lapse of time) is spatially moved with respect to the line of contact of the rotary rollers or drums 1 and 2.

Motion of the axis of rolling-up of the pellets during their shaping eliminates toroidality, imparts thereto a true spherical shape free from flashes and precludes a laminated structure of the pellets.

We claim:

1. A device for shaping spherical pellets, comprising: at least one pair of rotatable rollers having parallel axes of rotation and being disposed adjacent each other by their lateral cylindrical surfaces; open circular cannelures, semicylindrical in cross section, provided on said lateral roller surfaces with depressions, and located thereon in opposite pairs to form a row of shaping grooves, circular in cross section; halves of said cannelures, that are arranged asymmetrically with respect to their common middle diametral planes, transversal to said rollers, having a higher coefficient of friction than other halves of said cannelures.

2. The device as defined in claim 1, wherein the contours of said cannelures are formed by separate members made of materials having different values of the coefficient of friction.

3. The device as defined in claim 2, wherein said members are in the form of disks.

4. The device as defined in claim 2, wherein said members are in the form of rings.

5. The device as defined in claim 2, wherein said cannelures are formed by two of said members, the butts of which are located at the centers of said depressions, whereas others of said members, belonging to different ones of said rollers and located opposite each other, are made of the materials which have the different coefficient values.

6. A device as defined in claim 5, wherein said members have each two half cannelures, arranged symmetrically with respect to the middle diametral planes.

* * * * *